US006035027A

United States Patent [19]
Alleman

[11] Patent Number: 6,035,027
[45] Date of Patent: *Mar. 7, 2000

[54] INTERACTIVE TELEPHONE SYSTEM FOR OPTIMIZING SERVICE ECONOMY

[75] Inventor: James Harry Alleman, Boulder, Colo.

[73] Assignee: Cygnus Telecommunications Technology LLC, Minneapolis, Minn.

[*] Notice: This patent is subject to a terminal disclaimer.

[21] Appl. No.: 08/798,115

[22] Filed: Feb. 12, 1997

Related U.S. Application Data

[63] Continuation of application No. 08/252,984, Jun. 2, 1994, Pat. No. 5,883,964, which is a continuation of application No. 07/873,323, Apr. 24, 1992, abandoned.

[51] Int. Cl.[7] ...................................................... H04M 3/42
[52] U.S. Cl. .......................... 379/205; 379/201; 379/204; 379/210; 379/212
[58] Field of Search ...................................... 379/201, 207, 379/127, 142, 67, 88, 231, 233, 234, 202, 204, 205, 212

[56] References Cited

U.S. PATENT DOCUMENTS

| 4,086,438 | 4/1978 | Kahn et al. .............................. | 379/201 |
| 4,672,660 | 6/1987 | Curtin ..................................... | 379/142 |
| 4,757,267 | 7/1988 | RIskin .................................... | 379/201 |
| 4,769,834 | 9/1988 | Billinger et al. ........................ | 379/207 |
| 4,893,335 | 1/1990 | Fuller et al. ............................. | 379/212 |
| 5,181,236 | 1/1993 | LaVallee et al. ......................... | 379/67 |
| 5,185,782 | 2/1993 | Srinivasan ................................ | 379/67 |
| 5,218,631 | 6/1993 | Katz ........................................ | 379/88 |
| 5,317,627 | 5/1994 | Richardson, Jr. et al. ............... | 379/88 |

OTHER PUBLICATIONS

Business Week article titled "How Overseas Callers Can Get Statside Rates", p. 44 Dec. 2, 1991.
"The International CallBack Book", an insider view, by Gene Retske, pp. 11–17, 44, 53, 60, 62, 67 © 1995.
Yahoo Internet Search Conducted on Aug. 25 1997, 3 pages. Lists International callback service providers.
Telephony article titled: "Industry watch, New England Tel enhances Centrex . . . " p. 22, Jan. 25, 1988.
Telephony Journal, "You can't beat the price", vol. 228, No. 12, pp. 65–72, Mar. 20, 1995.
Telecom Markets Newsletter, "Call back resellers give telephone companies $120 million headache", Aug. 19, 1993.
Telecom Markets Newletter, "Resale entrepreneurs will find life tough with the carriers" Apr. 1, 1993.
Communications Week International, "Telecoms Discounters Call on Asia", Jun. 14, 1993.
Network World, "Callback Services offer users steep Discounts" vol. 10, No. 25, p. 28, Jun. 21, 1993.
Inbound/Outbound Magazine, "IBM's CallPath Explained" by Bill Maikranz, pp. 15, 16, 18 Oct. 1989.
Inbound/Outbound Magazine, "The Smart Way to handle Incoming Calls", by Keith Dawson, May 1990.
New York Times article, "Hot–Wiring Overseas Telephone Calls" by Anthony Ramirez, Jan. 9, 1992.
The Economist, "The Privateers", p. 79 Dec. 12, 1992.
Business Week, "Rome to Bonn Via New Jersey" p. 84, Apr. 13, 1992.
IDT Internet Home Page, "IDT: The First Fire Years", Downloaded from Internet Aug. 25, 1997.

*Primary Examiner*—Daniel S. Hunter

[57] ABSTRACT

A central location of a telephone switching system is placed where favorable local exchange tariffs are available. The central location includes a caller responsive unit which compares the caller identification accompanying the call attempt against a prestored list of identification data assigned to authorized system users. A positive comparison result causes the system to signal to the originator to terminate the call attempt. The system thereafter calls the originating caller telephone from the central location. The system allows the originating caller to input the number of the party to whom a connection is desired by the originator. The system responds by establishing a connection with the called party and bridges communications between the called and calling parties at the central location. The system includes the capability of employing audio responses of various types to calling or called parties.

11 Claims, 5 Drawing Sheets

INTERACTIVE TELEPHONE SYSTEM FOR OPTIMIZING SERVICE ECONOMY

This application is a continuation of application Ser. No. 08/252,984, filed Jun. 2, 1994, now U.S. Pat. No. 5,883,964, which in turn is a continuation of application Ser. No. 07/873,323 filed Apr. 24, 1992, which is now abandoned.

BACKGROUND OF THE INVENTION

Field of the Invention

The present invention relates to telephone switching systems in general and, more particularly, to telephone systems wherein interconnections between calling and called parties are performed under control of data processing or computer equipment. The present invention is especially useful in conjunction with telephone interconnection systems which are intended for providing the most economical domestic and international telephone service to those who subscribe to the service by providing apparatus and methods in a system organized for quickly and efficiently employing the most advantageous domestic and international tariff rates to user originated traffic.

Tariff rates for originating traffic often vary greatly. There is a need, therefore, to provide a service that will allow callers to take advantage of tariff rate differences to achieve the most economically advantageous cost for their respective domestic and international traffic.

Description of the Prior Art

Interexchange carriers (IXCs) are telecommunication carriers that provide what is commonly known as long distance, or interexchange, service between geographical areas called Local Access Transport Areas (LATAs). It is understood LATAs were created by a United States Federal Court in an antitrust case. The court limited local exchange companies (LECS) to providing telephone service only within LATAs (intraLATA service) and expressly forbid LECs to provide service between LATAs (interLATA service). Thus, IXCs receive originating traffic from the LEC in that LATA, carry the traffic to the terminating LATA, and deliver it to the LEC serving the terminating LATA.

A wide variety of sometimes user interactive arrangements for applying data processing equipment or computers to telephone line switching and control have developed. For instance, U.S. Pat. No. 4,071,698 by Barger et al describes an arrangement for demonstrating and then selling products, such as audio recordings, by the use of a telephone system. It employs either a human operator or an automated program as alternative interfaces. Both procedures make use of an audio repeater wherein product demonstrations are stored.

Statistical acquisition and analysis using a telephone system is disclosed in U.S. Pat. No. 4,792,968 by Katz. An example is in the obtaining of medical data from a selected group of people. A voice generator or a human operator prompts the called party to originate data by telephone instrument actuation. Yet another statistical data handling telephone system using audio units for prompting while utilizing multiple processors is shown in U.S. Pat. No. 4,845,739 by Katz. U.S. Pat. No. 4,930,150 by Katz applies a processor to make available a multiplicity of formats for services such as public polls, lotteries, auctions, promotions, sales operations and games. The telephone terminal of the user operates a switch to select a format with the processor testing to determine whether the request is proper. Katz et al in U.S. Pat. No. 4,932,046 describes use of a database to simulate a call termination signal to prompt the caller to hang up their telephone at the end of a recorded message.

An arrangement for conference call interconnecting a plurality of parties is shown in U.S. Pat. Nos. 4,939,773 and 4,987,590 by Katz. The system bridges all the telephones of an intended group with a voice generator for prompting. Authorization of the participants is verified.

Use of automatic audio response units in combination with telephone switching operations is shown in U.S. Pat. No. 3,482,057 by Abbott et al. A more interactive functioning in conjunction with a telephone call relay system is described in U.S. Pat. No. 4,975,945 by Carbullido. Remote user terminals communicate with an Audio Response Unit (ARU) or an attended terminal to acquire from the originating user certain identification and/or credit card information. A unique call reference number is assigned to the call and stored. If a need to relay the call exists, the caller is bridged to a terminal block for person to person audio communications.

The prior art has also recognized that it is possible to realize cost savings because of the telephone tariff differentials as between various geographic locations. For instance, calls originating from the United States are frequently less expensive than calls originating from another country.

Thus, a system was developed to take advantage of this tariff differential. In the prior art system, an input line is dedicated to a particular user.

That is, for each subscribing user there is a unique dedicated input line. When the user calls into the system on that line, typically allowing it to ring only once, the system employs an autodialer configuration to call the user who responds by entering the desired number. The system dials that number on another line and then bridges the user with it upon response by the called party.

The aforementioned system can likewise establish conference call patches, or the like, all at the local call tariff rates. Such a system is described in the Jan. 9, 1992 New York Times article entitled *Hot-Wiring Overseas Telephone Calls* by Anthony Ramirez. It suffers the disadvantage of requiring input telephone trunks dedicated to specific users with one such trunk for each user. It also is limited in flexibility and adaptability by the autodialer hardware. Thus a need remains for a system that can function with a minimum number of dedicated telephone trunks, but is expandable with ease to accommodate large numbers of subscribers while likewise enjoying the ability to rapidly relocate the entire system to other geographic areas to take advantage of changing tariff structures.

SUMMARY OF THE INVENTION

This invention, in cooperation with a public telephone network, provides an automated call processing system that incorporates an audio response unit and computer in a system arrangement for enabling a subscriber to initiate telephone calls whose network identified point-of-origin is a physical site other than the physical location of the subscriber. This objective will, among other things, enable subscribers to effectively realize the moo economically advantageous use of differences between tariff rates.

Further, this invention enables subscribers to initiate calls through the public telephone network without concern of unauthorized disclosure of the network identification number assigned to that subscriber. This invention also makes it possible to collect, store and archive detailed information of calls originated by subscribers for the purpose of billing subscribers and assisting with subscriber call management.

The objectives and advantages of this invention are achieved by providing subscribers with one, or more, telephone numbers that are assigned to this service by the local exchange telephone company provider (hereinafter referred to as the LEC), or an interexchange carrier (hereinafter referred to as an IXC). When a subscriber uses an assigned telephone number to establish a call to this service, the system will identify the subscriber by using a personal computer or switch software program. The system returns to the subscriber with either ringing or a unique tone. When the subscriber hears the ringing or unique tone, the subscriber manually, or automatically, terminates the call by hanging up.

Termination of the subscriber originated call signals the system to seize an outbound circuit over which it outpulses a number the subscriber has previously had entered into the system subscriber list database as that subscriber's "call-back" number. The subscriber answers the system call-back and is prompted to input the telephone number of the party the subscriber wishes to call (hereinafter referred to as "called party number").

Following input of the called party number, the system seizes a second outbound circuit, outpulses the called party number over the second outbound circuit and bridges the subscriber onto the second line. After the called party answers, the system continues to monitor the connection for a signal that the subscriber wishes to either terminate the session, or establish another connection to another called party.

Accordingly, the present invention includes a method of providing economical telephone service by employing the most advantageous tariff between an originator and a called party. A central location service center is established at which a call-back telephone number is provided for each subscribing call originator. A number is assigned for use for all calls that are placed by that originator. This assigned number is used to call the service center whereupon the originator is identified by the service center.

A signal is sent from the service center to the originator, thus indicating that the originator is identified whereupon the originator is instructed or prompted to terminate the call. Termination by the calling party is sensed at the service center followed by seizing of a first outbound circuit over which the service center outputs the call-back number for the identified originator. This operation reconnects the service center via a voice connection to the originator.

The originator is prompted to input the telephone number of the called party the originator intends to call. A second outbound circuit is seized at the service center whereupon the called party number is outputted to this second outbound circuit. Finally, the originator is bridged to the second outbound circuit thus connecting the originator with the called party.

The process, or system apparatus, in accordance with this invention, is preferably contained at a central location or service center. Since it is essentially self-contained for its purpose and requires a minimal number of lines connecting it to an exchange, the present invention is adaptable for relatively easy relocation to interface with the most economic tariff rate location wherever that might physically present itself throughout the world.

The process and apparatus of this invention interactively establishes communication links between a calling party and one or more parties called by that calling party. It employs input and output connections to a telephone exchange that provides interface switching of the calling party with the central location. A signal is generated containing data uniquely identifying the originating station of the calling party which signal is placed on the input connection to the central location whenever the calling party places a call to that input connection from their station.

The central location stores the unique identifying data of one or more authorized calling party subscribers. A signal on the central station input connection attempting to establish communications between the exchange and the central location causes the system to compare the data of the identifying signal associated with the connection attempt with the contents in the data storage.

In response to a favorable comparison, a cali is originated from this central location to the calling party station. Signals are then received from the calling party station for identifying a called party station with which the calling party desires to establish a communication connection. That is, these calling party originated signals identify a third party station. The central location finally bridges a communication connection between the calling party station and the third party station.

Preferably, the present invention responds to a favorable identification comparison as mentioned above by returning an audible signal to the calling party. This indicates the favorable comparison result so that the calling party will know to terminate the call attempt so as to allow the central location to originate a call to the call originating station. Failure of the calling party to terminate the call attempt a predetermined period of time after the recognition signal is given or from the time of commencement of an attempt to establish a connection from the calling party station terminates further processing of the connection attempt at the central location.

Connection attempt termination, because of the time-out function or a failure to produce a favorable comparison, can trigger a process which results in temporarily establishing a communication connection with the calling party station for presenting an audio message thereto. The central location typically will disconnect from the calling station after completion of an audio message.

The present invention is particularly well suited for advantageously utilizing the calling party identifying data In the form of the contemporary direct inward dial number produced by the exchange. Thus, the central location stores in a memory the direct inward dial number for each calling party authorized to utilize the system. Following a favorable comparison of the calling party number with a stored number, the system obtains the direct inward dial number from storage for placing that number on an output connection to the exchange.

A failure of the called party to answer the call attempt from the central location can result in provision of an indication to the calling party that they can select between terminating connection attempts or attempting to establish a connection with another third party. The invention can accommodate establishment of a multiple party conference call in response to calling parties instructions to the central location.

The system is likewise well suited for receiving and collecting management and billing information on calls established by the system. This enables a determination of the extent of use of the system by authorized and/or unauthorized calling parties. After establishing a communication connection with the calling party station, the central location can respond to a special signal originated from the calling party station so as to terminate further communication and communication attempts with the calling party station. This invention can utilize a dual tone multi-frequency signal as the above mentioned special signal from said calling party station.

The method and apparatus of this invention provides an economical telephone service by employing the most advantageous tariff between all originator and one or more called parties. A service center is established at which a call-back telephone number is provided for each originator, and at which a number is assigned for use for all calls that are placed by that originator. The assigned number is used to call the service center whereupon the originator is identified by the service center.

A signal is sent from the service center to the originator thus indicating that the originator is identified whereupon the originator is instructed to terminate the call. Sensing originator call attempt termination, the service center responds by seizing a first outbound circuit over which the service center outputs the call-back number for the identified originator thereby reconnecting the service center to the originator.

The originator is prompted to input the telephone number of the called party the originator intends to call. A second outbound circuit is seized at the service center whereupon the called party number is outputted to the second outbound circuit. Bridging the originator to the second outbound circuit thus connects the originator with the called party.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENT

A network identification number, commonly known as an Automatic Number Identification (ANI) and/or Calling Number Identification (CNI), are widely employed in the telephone industry. Such numbers are required by the public telephone network to rate, route and bill appropriate parties for completed telephone calls. Current technologies in the public telephone network makes it possible to disclose the calling party network identification numbers to the called party during the ringing cycle of the called party telephone. The present invention advantageously utilizes (but does not require) disclosure of these identification numbers to the called party.

Accordingly, the present invention advantageously utilizes the Direct Inward Dial (DID) numbers. Under LEC tariffs it is possible to lease a block, or group, of telephone numbers. The size of the groups may vary between LECs, but a group of one hundred numbers is often a typical group. When these numbers are sequential, they are commonly referred to as blocks, but groups of random numbers are also used.

For purposes of this invention, sequential numbering is not required. The customer leasing the numbers from an exchange does not have to lease a corresponding terminating circuit for each number in the group in order to place a call to each number. Instead, the customer leases local facilities in quantities the customer feels are adequate to handle traffic from the leased numbers. When a caller dials one of the numbers in the group, the central office of the terminating LEC (the LEC that assigned the numbers) will complete the call over any of the leased local facilities that are available and also pass the last four, sometimes five, numbers that the calling party dialed. The numbers that are passed are called the Direct Inward Dial, or DID, numbers.

If a calling party (in the case of this invention, a "subscriber") is given one of the assigned numbers to dial to reach the system, the system can identify that subscriber because it will receive the last four, or five, numbers of the number the subscriber dialed. It is thereafter a relatively conventional software process to determine call validity by matching the DID numbers against a subscriber list.

While a detailed illustrative description of a preferred embodiment of this invention is provided herein, those having normal skill in the art will recognize that there are a wide variety of physical communications systems, data formats and operating structures, available to implement this invention. Some of those alternatives may comprise structures and processes quite different from those of the disclosed description. Consequently, the specific structural and functional details disclosed herein are merely representative, yet in that regard they are deemed to afford the best description for purposes of disclosure of an enabling preferred embodiment and to provide a basis for understanding the spirit of this invention.

Figure 1:
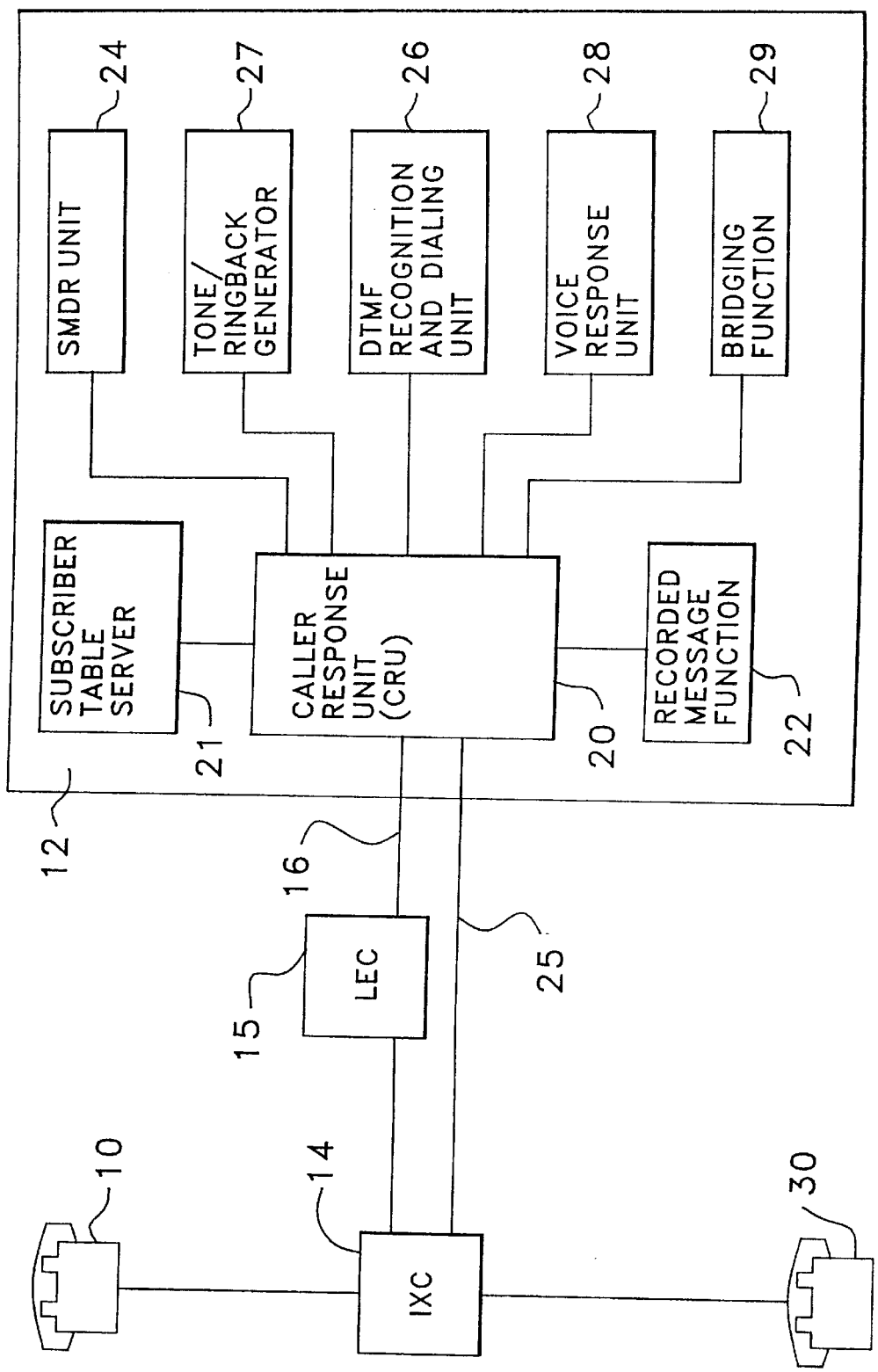
FIG. 1 is a generalized block diagram of a system organization in accordance with the present invention.

A block diagram of the system environment of this invention is presented in FIG. 1. A user or subscriber is represented as connected to the system via a telephone handset at station 10. The user initiates the system operation by placing a call through the domestic and/or international public telephone network (IXC) 14 using one of a number of telephone numbers assigned to the service center master system 12 by local exchange company (LEC) 15.

LEC 15 directs the call over incoming direct inward dial (hereinafter referred to as DID) circuits 16 to a call response unit (CRU) 20. CRU 20 includes a computer, controller, or other suitable date processing unit along with appropriate sensing circuit connections as is conventional for data acquisition and control technology. CRU 20 will attempt to identify the caller by electing the DID numbers passed to the system by the LEC 15, and deliver those digits to the subscriber table server 21, which contains the database that identifies subscribers by matching DID numbers against a list of call-back numbers provided by subscribers.

More particularly, CRU 20 is a computer, or switch, that is connected to the LEC 15 central office and consisting of integrated components that permit the system to perform a number of functions integral to this invention. This includes switching functions to handle line (circuit) connections; interactive voice response operations; database controller for subscriber identification; and a system message detail recording (SMDR) unit 24 to provide information necessary to create call records.

Callers are also identifiable via IXC 14 generated DTMF signals that are passed to the system. DTMF means Dual Tone Multifrequency. These are signaling tones used by customer premises equipment and LEC central offices to signal each other. A common use of DTMF by customer premises equipment is to pass to the central office the telephone number to which the calling party wishes to establish a connection.

If the caller reaches CRU 20 by calling an "800" number assigned to the system, CRU 20 will attempt to identify the caller by prompting the caller to enter, via DTMF, a personal identification number (PIN) unique to that subscriber. The PIN is then delivered to the subscriber table server 21 for comparison against the subscriber list of call-back numbers. It is important to note that, while the use of DID numbers is one of the most practicable means of obtaining subscriber recognition at this time, is invention is not limited to DID identification of subscribers.

As further technological services and features of the public network are introduced, particularly those services and features relying upon Signalling System 7 technology, this invention may achieve subscriber recognition through a variety of means, such as, but not limited to, calling number identification, automatic number identification and other technologies that permit recognition of the calling party as offered by LECs, IXCs and other telecommunications carriers.

At the same time the CRU 20 delivers the DID digits to the subscriber table server 21, it also delivers call detail information to the system message detail recording database (SMDR) 24. The call detail information includes information relative to all events relating to the setup and completion of telephone calls to and from this invention.

CRU 20 responds to the incoming call signal by generating either a traditional ring-back signal, or a nonstandard sound (music, or some tone other than the normal ring-back signal). As a condition of the service, upon hearing the ring-back or nonstandard tone, the subscriber hangs up (goes on-hook).

When the subscriber table server 21 matches the DID digits with a subscriber call-back number, CRU 20 seizes one of the outbound circuits 25 from the group of such circuits that are connected directly to an IXC 14. The call-back number is then outpulsed by the DTMF recognition and dialing unit (hereinafter referred to as the DTMF generator) 26. When the subscriber answers (goes off-hook), CRU 20 activates voice responder unit 28 which prompts the subscriber to enter, via DTMF, a called party number.

When the subscriber enters a called party number, CRU 20 seizes a second outbound circuit 25. DTMF Generator 26 recognizes the called party number DTMF digits entered by the subscriber and outpulses those digits over the second seized circuit. DTMF generator 26 activates bridging function 29 to bridge the subscriber onto the second outbound circuit. DTMF recognition and dialing unit 26 also monitors call progress tones; e.g., ringing, busy, off-hook (answer).

At all times, including after the called party has answered, CRU 20 continues to monitor the seized circuits 25 for a prearranged DTMF sequence that the DTMF Generator 26 will recognize as a signal from the subscriber indicating an intention to terminate the call in progress and possibly to initiate another call. Upon receiving the prearranged DTMF sequence, CRU 20 disconnects from the outbound circuit 25 connecting the called party to the system. The voice response unit 28, or some other audio signal, prompts the subscriber to input another called party number.

In the illustrative system example of FIG. 1, a series of operating processes are executed, as illustrated in the general flow diagrams of FIGS. 2 through 4, as described in detail below.

Figure 2:
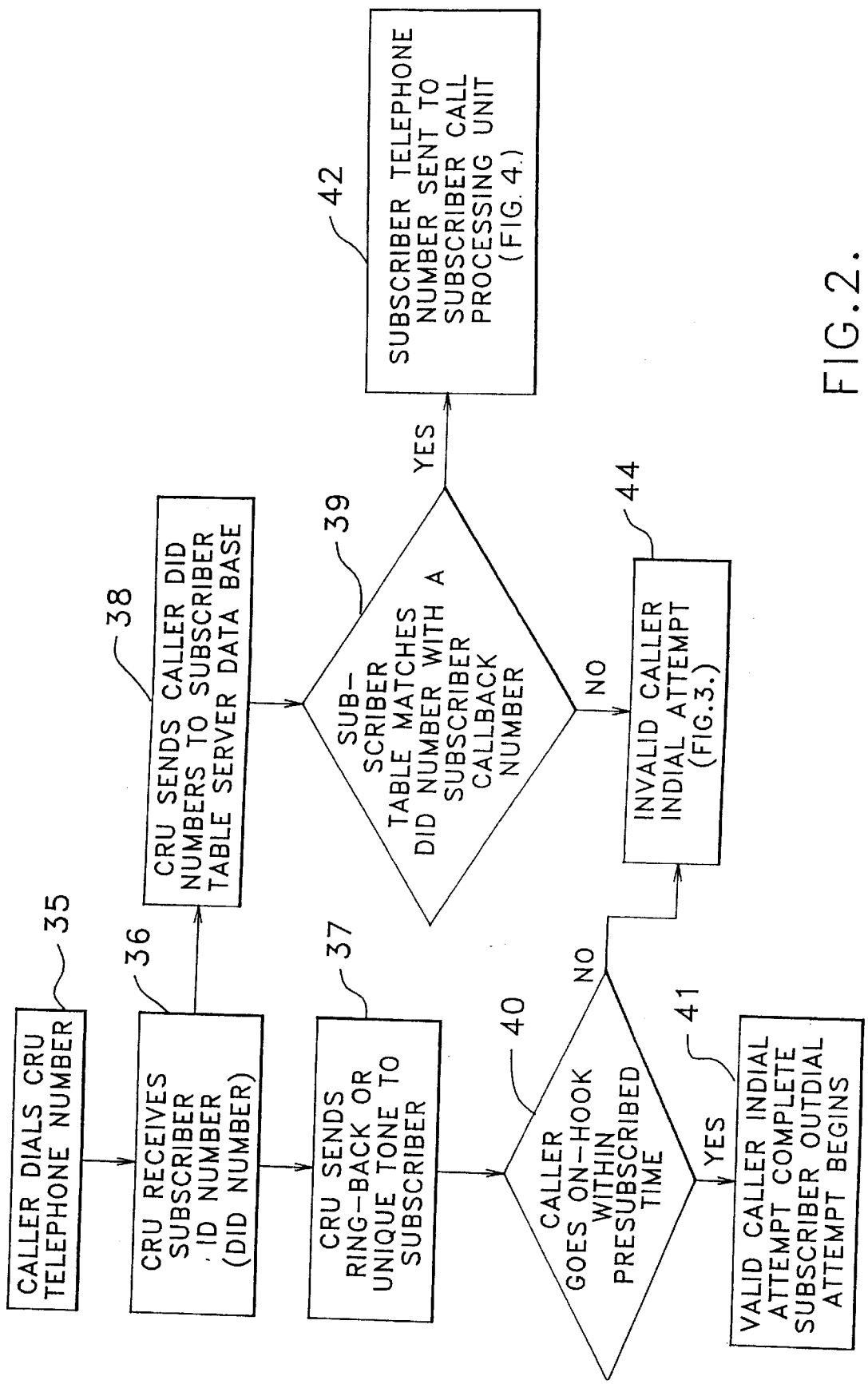
FIG. 2 is a flow diagram of a component function of the system for determining the validity of a caller or subscriber attempt to dial into the system.

FIG. 2 illustrates the operating process associated with determining that a caller indial attempt is valid or invalid. This process is initiated at 35 when a caller dials one of the telephone numbers assigned to the system 12. CRU 20 receives the incoming call signal at 36 and the DID numbers at input 16 from the LEC 15, and responds at 37 with either a traditional ring-back signal, or non-standard sound. By not going off-hook, the terminating central office for LEC 15 will not return answer supervision to the originating end of the circuit. Answer supervision is a signaling process by which the terminating LEC central office signals to the originating LEC central office that the called number has gone off-hook (answered) and timing should commence for billing purposes.

At the same time, CRU 20 delivers the DID numbers to the subscriber table server 21 at 38, which is followed by an attempt at 39 to match the DID digits with a subscriber call-back number stored in the database of subscriber table server 21. A favorable match results at 42 in the sending of the subscriber telephone number to the subscriber call processing unit (not shown). Upon hearing the ring-back, or nonstandard tone, caller 10 terminates the call to CRU 20 by hanging up (go on-hook) within a predetermined time at 40.

When the caller hangs up concurrent with a valid DID match 39, the valid caller indial attempt is completed at 41. Note that the invalid call procedure of FIG. 3 is invoked at 44 if either a match of a valid DID number stored in the server 21 database is not produced or a failure is detected at 40 that the caller 10 has not terminated the call-within a predetermined time period. The time period for subscribers to terminate the connection to CRU 20 upon hearing the ring-back, or unique tone, is predetermined. Typically suitable such time periods considered acceptable for this invention can vary between five and fifteen seconds.

Figure 3:
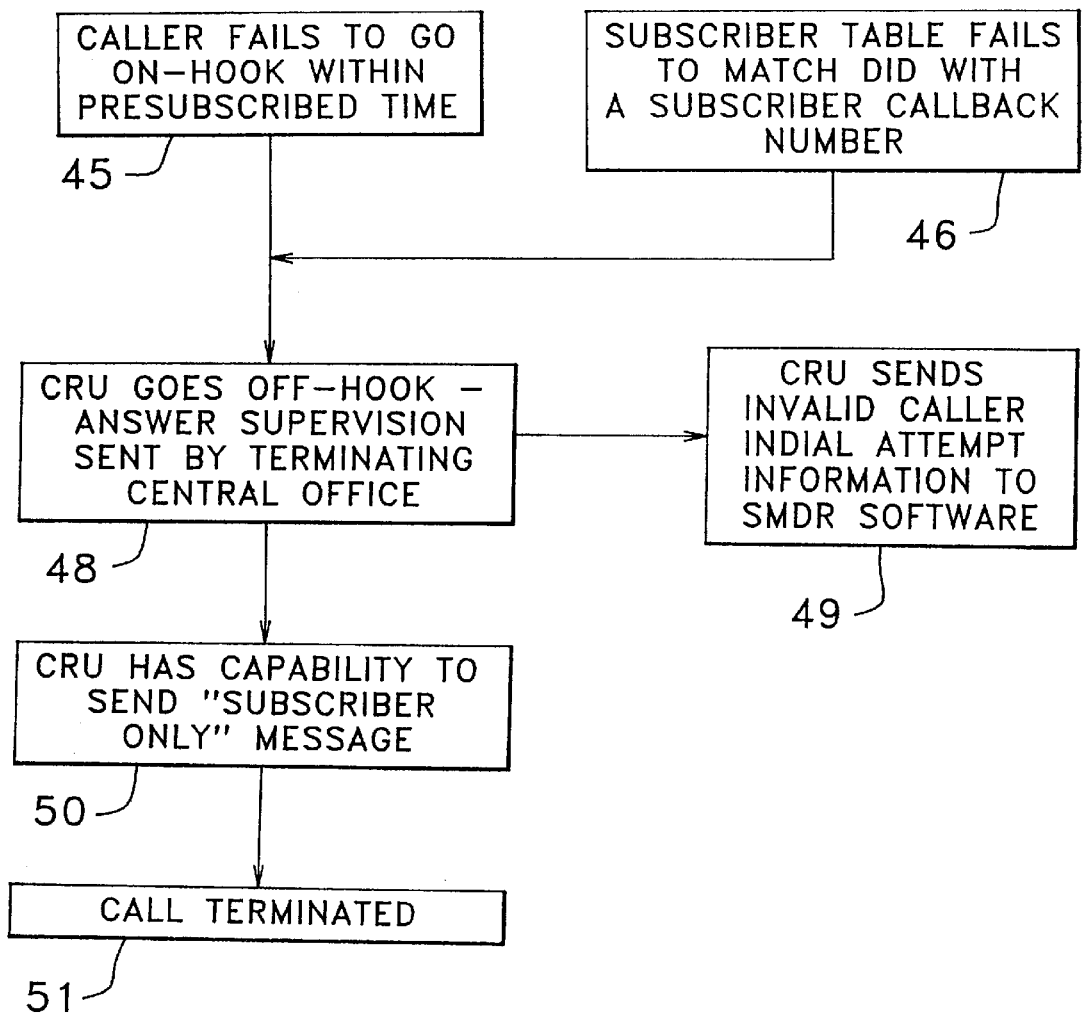
FIG. 3 is a flow diagram of a component function of the system responsive to either an invalid caller attempt to dial into the system or failure of a valid user to terminate the call within a predetermined period of time.

FIG. 3 illustrates the process in response to failure conditions. The first response at 45 is to the fact that calling party 10 failed to hang up (go on-hook) within a predetermined time. This is treated as initiation of an invalid caller indial attempt. When the predetermined time for calling party 10 to hang up elapses without a disconnect by caller 10, CRU 20 at 48 goes off-hook and sends answer supervision to the originating central office. When answer supervision is received at the originating central office, call completion takes place and timing of the call begins.

CRU 20 has the capability to send a voice message to the caller during an invalid caller indial attempt stating that service reached by the calling party is for subscribers only, as shown at 50. The message could also include a telephone number the calling party can call to initiate service if he, or she, desires. This message is sometimes hereinafter referred to as the "subscriber only message". After delivering the message, CRU 20 terminates the call by going on-hook at 51.

FIG. 3 also illustrates at 46 the response to an invalid caller indial attempt indication that is created when the subscriber table server fails to match the DID digits received with a valid subscriber call-back number. CRU 20 indicates to the SMDR software at 49 that the invalid caller indial attempt did occur.

Note that it is assumed for purposes of this invention that the failure of the calling party to terminate the call within the predetermined time limit means that the calling party is not a subscriber to the service provided by this invention. The call initiation into the central location 12 is thus deemed coincidental or perhaps even unauthorized.

Figure 4:
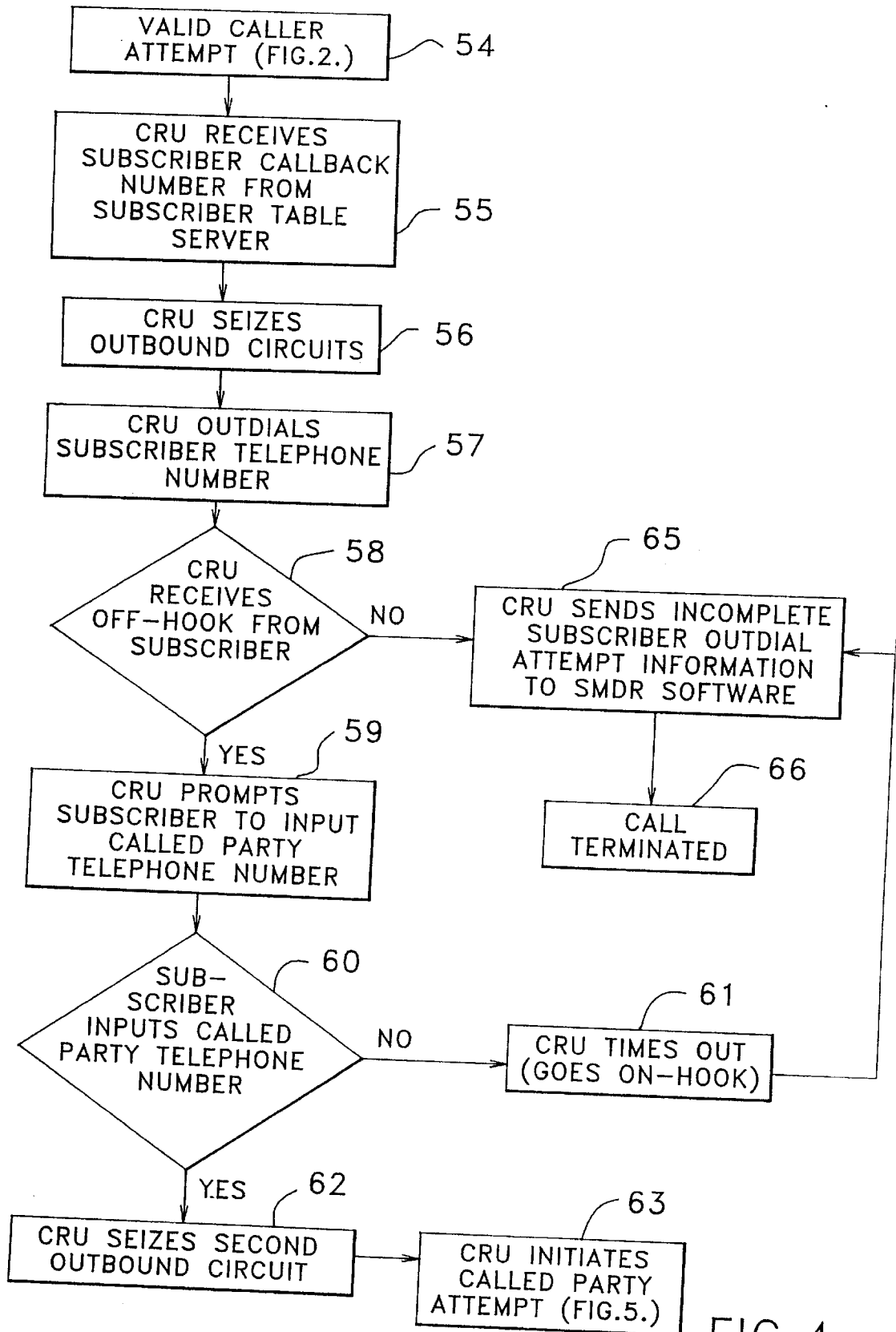
FIG. 4 is a flow diagram of a component function of the system response in the presence of a valid input from a user or subscriber including an automated outdial attempt.

FIG. 4 illustrates the operating process in response to a subscriber outdial attempt. When the FIG. 2 process results in a decision that a valid subscriber indial attempt has occurred at 41, this produces initializing input 54 in FIG. 4. The subscriber table server (21) matches the DID digits with a valid subscriber call-back number at 55. CRU 20 next seizes one outbound circuit 56, and initiates DTMF outdial of the subscriber call-back number over the seized outbound circuit at 57.

When the subscriber answers, CRU 20 will recognize the subscriber off-hook at 58, and prompt the subscriber at 59 to enter, via DTMF, a called party number. If decision 60 recognizes subscriber input of a called party number, CRU 20 seizes a second outbound circuit 62, and initiates a called party attempt 63. The steps associated with the called party attempt operating process are illustrated in FIG. 5, and described in detail below.

Decision 58 also recognizes whenever, after out-dialing the subscriber call-back number, CRU 20 has not received an off-hook within a predetermined time. This results in CRU 20 terminating the call (66) and an incomplete subscriber outdial attempt is sent at 65 for recording in the SMDR database.

Figure 5:
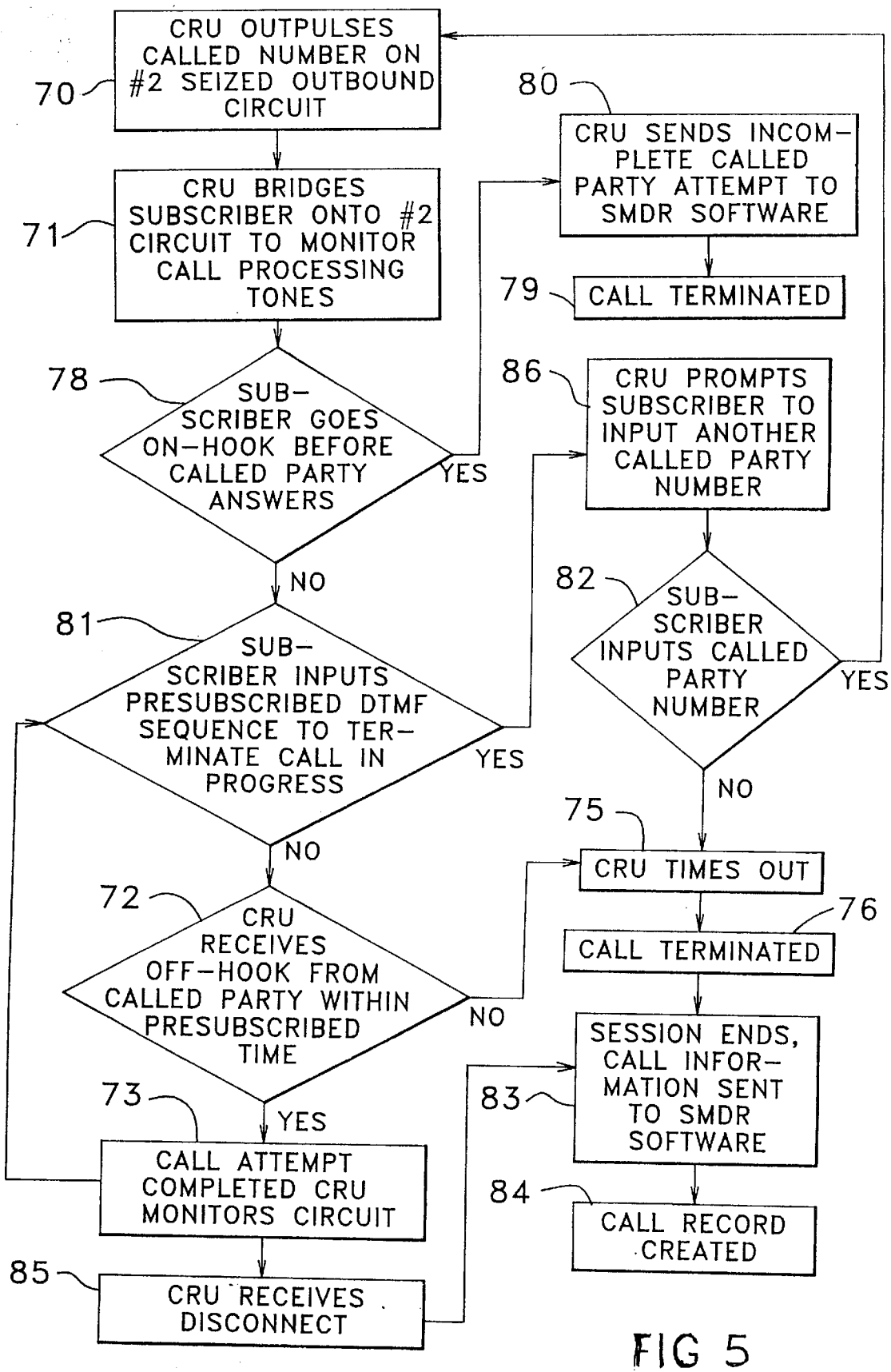
FIG. 5 is a flow diagram of a component function of a system attempt to establish a connection with a called party in response to a proper user input.

FIG. 5 illustrates the steps associated with a called party attempt operating process. When a second outbound circuit is seized, as described at 62 in FIG. 4, CRU 20 outpulses the called party number at 70, and bridges the subscriber onto the second outbound circuit to monitor call progress tones at 71. The called party answering or going off-hook within a predetermined time causes decision 72 to recognize that the called party attempt process is complete, and the CRU will continue to monitor the circuit 73.

Conversely, if CRU 20 decision 72 has not received an off-hook signal from the called party within a predetermined time 75, CRU 20 will time out and the call is terminated at 76. Also, if decision 78 notes that the subscriber terminated the connection by going on-hook (hanging up) before the called party answers, the called party attempt is terminated at 79, and an incomplete called party attempt is recorded in the SMDR data at 80.

Finally, if the subscriber inputs a prearranged DTMF sequence at 81, either prior to the called party answering or at anytime after the called party attempt is completed but before a disconnect signal is received, decision 81 terminates the called party attempt in progress, and CRU 20 will prompt the subscriber to input another called party number at 82. When decision block 82 recognizes presence of a subscriber input of another called party number, another called party attempt is initiated as CRU 20 outpulses the new called party number at 70.

A call is terminated 76, the call session ended 83 with call information sent to the SMDR software, and a call record created 84 under the following two conditions: First, if the CRU times out at 75, either because it does not receive a called party number within a predetermined time after prompting the subscriber to enter such a number 86, or because it does not receive an off-hook from a called party within a predetermined time 72; and second, if at any time CRU 20 receives a disconnect signal from either the subscriber or the called party end of the circuit 85.

While the exemplary preferred embodiment of the present invention are described herein with particularity, those having normal skill in the art will recognize various changes, modifications, additions and applications other than those specifically mentioned herein without departing from the spirit of this invention.

What is claimed is:

1. A telephone system for providing economical use of differences in long distance tariff rates for international telephone service to subscribers, comprising a service center having a direct inward dial number assigned to each subscriber and an assigned call-back number recorded for each subscriber, a sensor for receiving the direct inward dial signal sent by the subscriber to the service center, a first outbound circuit from the service center over which the center dials the callback number of the subscriber when the direct inward dial number is triggered and on which the subscriber enters the number of the called party, a second outbound circuit from the service center over which the center dials the number entered by the subscriber on the first circuit to reach the called party, and an automatic bridging device for bridging the subscriber on the first circuit to the called party on the second circuit, whereby the subscriber is telephonically linked to the called party without human intervention at the service center.

2. The system according to claim 1 wherein the service center indicates an invalid call attempt if the direct inward dial call does not terminate within a predetermined period of time.

3. The system according to claim 2 wherein the system presents an audio message to the subscriber in response to the invalid call attempt.

4. The system according to claim 1 wherein the system indicates an invalid call attempt to the subscriber if the subscriber dials a number other than his direct inward dial number.

5. The system according to claim 4 wherein the system presents an audio message to the subscriber in response to an invalid call attempt.

6. A method for economically using differences in long distance tariff rates for international telephone service comprising (a) a subscriber to a telephone service dials a service center on a direct inward dial number assigned to the subscriber by the service, (b) the subscriber hangs up after a predetermined interval, (c) the service automatically calls back the subscriber at an assigned call-back number on a first outbound circuit, (d) the subscriber enters the number of the called party on the first circuit, (e) the service automatically calls the called party on a second outbound circuit, and (f) the service automatically bridges the two circuits, telephonically connecting the subscriber to the called party.

7. A method as in claim 6 wherein the incoming direct inward dial signal from the subscriber is terminated if the subscriber dials a number other than his assigned direct inward dial number.

8. A method as in claim 6 wherein a prerecorded message is played to the subscriber if the direct inward dial number entered by the subscriber is other than his assigned direct inward dial number.

9. A method as in claim 6 wherein the subscriber is informed that it is an invalid call attempt if the subscriber does not terminate the direct inward dial call within a predetermined period of time.

10. A method as in claim 7 wherein the subscriber is also given a prerecorded message if the call is not terminated.

11. In a method for economically using differences in tariff rates for international calls by originating calls from a location having relatively lower tariff rates to a location having relatively higher rates, in which a subscriber calls a service located in a jurisdiction having relatively low cost outbound calls, the service calls the subscriber back on an outbound circuit, the subscriber enters the telephone number of the called party in the called party's jurisdiction, the service calls the called party on a second outbound circuit, and the service bridges the two circuits to telephonically connect the subscriber and the called party, the improvement comprising using direct inward dialing for the initial call from the subscriber to the service, and the subscriber hangs up before there is a charge for the call from the subscriber to the service.

* * * * *

EX PARTE REEXAMINATION CERTIFICATE (6588th)

United States Patent
Alleman

(10) Number: US 6,035,027 C1
(45) Certificate Issued: *Dec. 30, 2008

(54) INTERACTIVE TELEPHONE SYSTEM FOR OPTIMIZING SERVICE ECONOMY

(75) Inventor: James Harry Alleman, Boulder, CO (US)

(73) Assignee: Cygnus Telecommunications Technology, LLC, Minneapolis, MN (US)

Reexamination Request:
No. 90/007,309, Nov. 18, 2004

Reexamination Certificate for:
Patent No.: 6,035,027
Issued: Mar. 7, 2000
Appl. No.: 08/798,115
Filed: Feb. 12, 1997

(*) Notice: This patent is subject to a terminal disclaimer.

Related U.S. Application Data

(63) Continuation of application No. 08/252,984, filed on Jun. 2, 1994, now Pat. No. 5,883,964, which is a continuation of application No. 07/873,323, filed on Apr. 24, 1992, now abandoned.

(51) Int. Cl.
*H04M 3/42* (2006.01)

(52) U.S. Cl. ............................ 379/205.01; 379/204.01
(58) Field of Classification Search ............. 379/210.01, 379/207.01, 205.01, 204.01
See application file for complete search history.

(56) References Cited

U.S. PATENT DOCUMENTS

| | | | |
|---|---|---|---|
| 4,166,929 A | * | 9/1979 | Sheinbein ............... 379/209.01 |
| 4,313,035 A | * | 1/1982 | Jordan et al. ........... 379/211.02 |
| 4,313,036 A | * | 1/1982 | Jabara et al. ................ 379/230 |
| 4,401,856 A | | 8/1983 | Curtin et al. |
| 4,413,158 A | | 11/1983 | Danford |
| 4,757,267 A | | 7/1988 | Riskin |
| 4,878,240 A | | 10/1989 | Lin et al. |
| 4,935,956 A | | 6/1990 | Hellwarth et al. |
| 4,975,941 A | | 12/1990 | Morganstein et al. |
| 5,027,387 A | * | 6/1991 | Moll ..................... 379/115.02 |

OTHER PUBLICATIONS

Ed Greenberg, *Telecom\*USA*, Telecom Digest, vol. 11, Issue 56 (Jan. 21, 1991). Archived document is available at: http://massis.lcs.mit.edu/archives/back.issues/1991.volume.11/vol11.iss051–100.

Timothy Newsham, *Question About MCI Personal 800 Number PINS*, Telecom Digest, vol. 11, Issue 141 (Feb. 20, 1991). Archived document is available at: http://massis.lcs.mit.edu/archives/back.issues/1991.volume.11/vol11.iss101–150.

Hector Myerston, *Dialing 800 Services from Overseas*, Telecom Digest, vol. 8, Issues 190–213 (Dec. 7, 1988). Archived document is available at: http://massis.lcs.mit.edu/archives/back.issues/1988.volume.8/vol8.iss190–213.

* cited by examiner

*Primary Examiner*—Roland G. Foster

(57) ABSTRACT

A central location of a telephone switching system is placed where favorable local exchange tariffs are available. The central location includes a caller responsive unit which compares the caller identification accompanying the call attempt against a prestored list of identification data assigned to authorized system users. A positive comparison result causes the system to signal to the originator to terminate the call attempt. The system thereafter calls the originating caller telephone from the central location. The system allows the originating caller to input the number of the party to whom a connection is desired by the originator. The system responds by establishing a connection with the called party and bridges communications between the called and calling parties at the central location. The system includes the capability of employing audio responses of various types to calling or called parties.

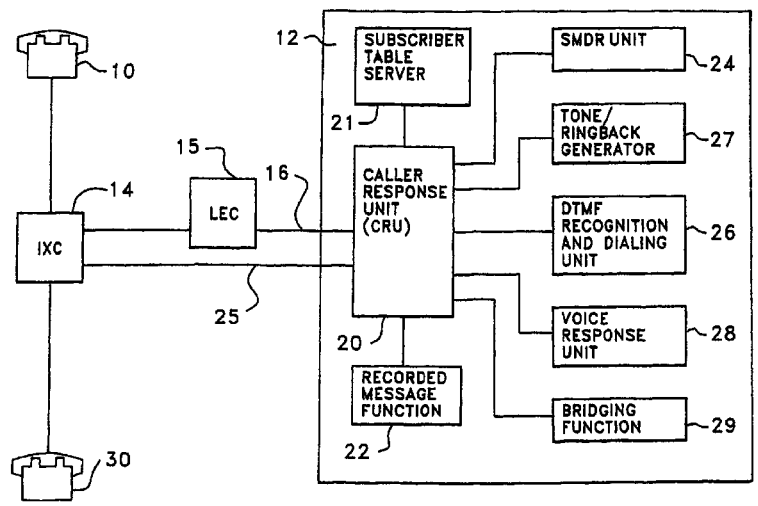

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

Claim 11 is cancelled.

Claim 6 is determined to be patentable as amended.

Claims 7–10, dependent on an amended claim, are determined to be patentable.

6. A method for economically using differences in long distance tariff rates for international telephone service *for a subscriber to call a destination using a service provided by a service provider* comprising (a) *the service provider assigns a direct inward dial telephone number to the subscriber and stores in a database (1) the assigned number associated with (2) a number at which the subscriber wishes to be called back,* (b) [a] *the* subscriber [in a foreign country to a telephone service dials a] *sends to the* service [center in the United States that is not in a closed user group on a] *the direct inward dial number assigned to the subscriber by the service provider,* [(b)] (*c*) the subscriber hangs up at the end of a predetermined interval [before the service center answers in order to avoid a charge by the subscriber's local telephone company], [(c)] (*d*) the service automatically calls *the subscriber back at the number retrieved from the database in association with the assigned direct inward dial number* on a first outbound circuit [(d) the subscriber enters the number of the called party on the first circuit,] (e) the service automatically calls the [called party] *destination* on a second outbound circuit, and (f) the service automatically bridges the two circuits, telephonically connecting the subscriber to the [called party] *destination*.

* * * * *